US009236065B2

United States Patent
Abe et al.

(10) Patent No.: US 9,236,065 B2
(45) Date of Patent: Jan. 12, 2016

(54) RECLAMATION OF DATA ON TAPE CARTRIDGE

(71) Applicant: International Business Machines Corporation, Armonk, NY (US)

(72) Inventors: Atsushi Abe, Tokyo (JP); Yumiko Ohta, Kanagawa (JP); Setsuko Masuda, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/511,660

(22) Filed: Oct. 10, 2014

(65) Prior Publication Data

US 2015/0146317 A1    May 28, 2015

(30) Foreign Application Priority Data

Nov. 25, 2013    (JP) ................................ 2013-243395

(51) Int. Cl.
| | |
|---|---|
| G11B 5/02 | (2006.01) |
| G11B 5/09 | (2006.01) |
| G11B 5/008 | (2006.01) |
| G11B 20/12 | (2006.01) |

(52) U.S. Cl.
CPC ........ *G11B 5/00817* (2013.01); *G11B 20/1201* (2013.01); *G11B 20/1202* (2013.01); *G11B 2020/1292* (2013.01)

(58) Field of Classification Search
CPC .... G11B 5/012; G11B 27/36; G11B 20/1009; G11B 2220/90; G11B 27/3027; G11B 15/52
USPC ............. 360/25, 31, 39, 48, 50, 53, 55, 77.12
See application file for complete search history.

(56) References Cited

U.S. PATENT DOCUMENTS

| | | | |
|---|---|---|---|
| 8,738,588 B2 | 5/2014 | Cannon et al. | |
| 8,966,169 B2 * | 2/2015 | Shiratori et al. | ............... 711/111 |
| 2008/0243860 A1 | 10/2008 | Cannon et al. | |

FOREIGN PATENT DOCUMENTS

WO    2008116751 A1    10/2008

* cited by examiner

*Primary Examiner* — Nabil Hindi
(74) *Attorney, Agent, or Firm* — James R. Nock

(57) ABSTRACT

A method is provided for automatically reclaiming areas with unneeded data in a tape cartridge (medium) storing files updated by appended writing. In this reclamation method, the appended writing entails the sequential compression of data needed by the updated file (needed data) and data not needed by the file (unneeded data) and storage of the compressed data on the medium, and the medium is divided into at least three data partitions for the storage of data.

8 Claims, 12 Drawing Sheets

Tape Divided Longitudinally Into Two Partitions

Notes)
- Wrap: Group of tracks read or written at the same time by a head (16 channels)
- Wrap Pattern: Reversing of the traveling direction of the tape with respect to the head at the BOT and EOT of adjacent wraps (wrap turns)

FIG. 3
(A) No Changes or Deletions, Easy-to-Read
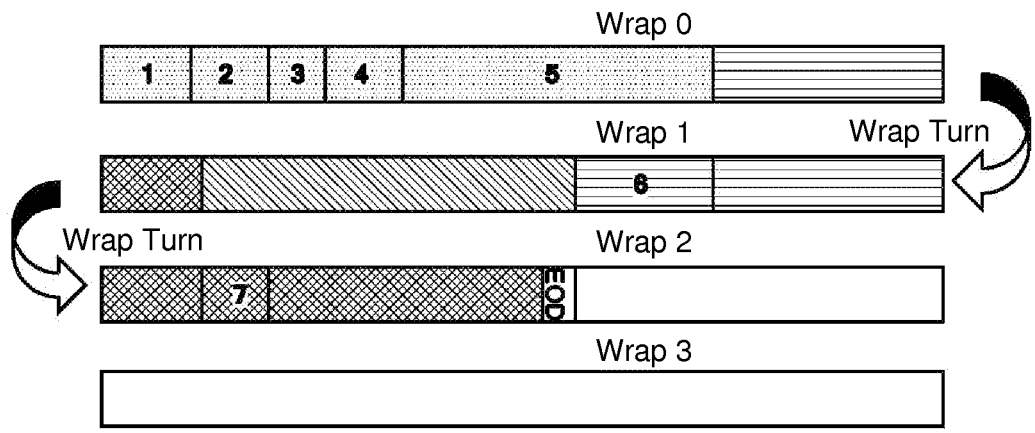
(B) Changes and Deletions, Read/Write Data Appended
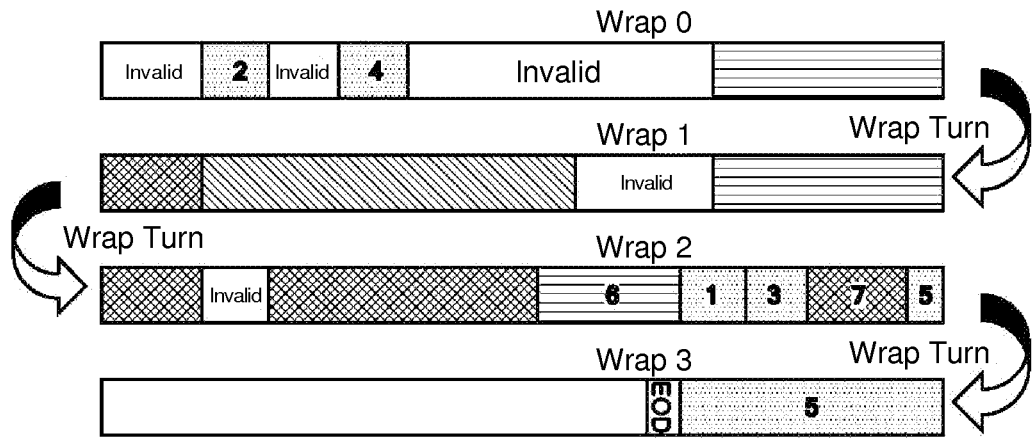
Note) 1st File →
2nd File →
3rd File →
4th File →

FIG. 4

LTFS Format and File Addition and Modification (A) Information written to tape immediately after initialization using LTFS format IP: | FID | VOL1 Label | FM | LTFS Label | FM | Index #0 | FM |

DP: | FID | VOL1 Label | FM | LTFS Label | FM | Index #0 | FM |

(B) (A) Information written to tape when File 1 is written after State (A)

IP: | FID | VOL1 Label | FM | LTFS Label | FM | Index #1 | FM |

DP: | FID | VOL1 Label | FM | LTFS Label | FM | Index #0 | FM | File 1 | FM | Index #1 | FM |

(C) (B) Information written to tape when additional files (File 2) are written after State (B)

IP: | FID | VOL1 Label | FM | LTFS Label | FM | Index #2 | FM |

DP: | FID | VOL1 Label | FM | LTFS Label | FM | Index #0 | FM | File 1 | FM | File 2 | FM | Index #2 | FM |

(D) (B) Information written to tape after addition of and/or changes to character information (File 1-2) after State (B)

IP: | FID | VOL1 Label | FM | LTFS Label | FM | Index #2 | FM |

DP: | FID | VOL1 Label | FM | LTFS Label | FM | Index #0 | FM | File 1-1 | FM | Index #1 | FM | File 1-2 | FM | Index #2 | FM |

FIG. 5
File 1 (Size L) Rewrite and Extend (Index File)
(A) File 1 (Size L) Rewrite and Extend (Index File)
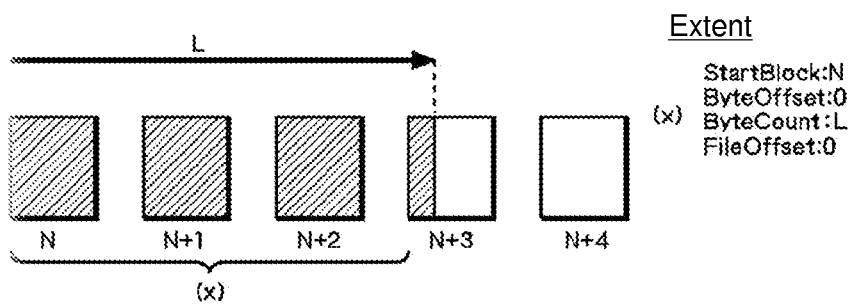
(B) Information When 600 KB From Mth Byte of File 1 Rewritten Using 250 KB of Data
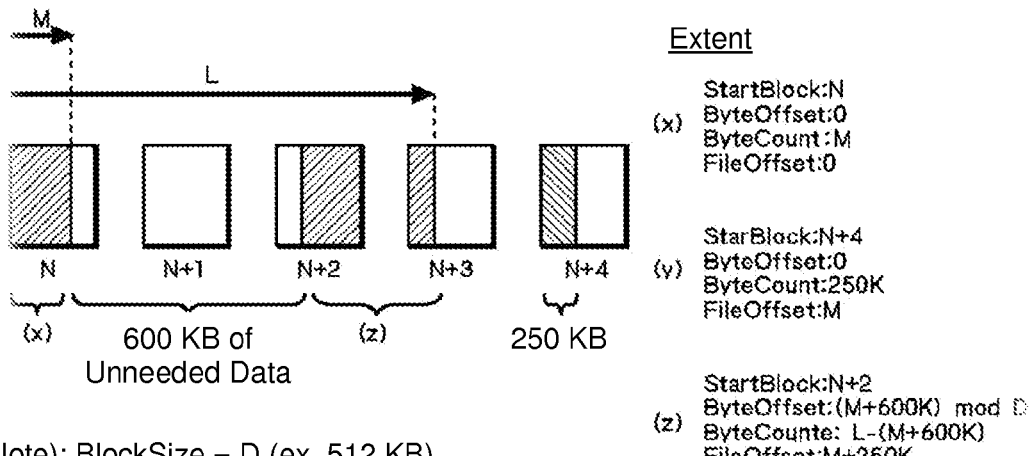
Note): BlockSize = D (ex. 512 KB)

(1) Written: DP1, DP2
Start writing data from DP1, and start writing data to DP2 after data written to DP1 reaches a predetermined capacity Note)
- ▨ in DP1 = Area of Unneeded Data
- ▨ in DP1 = Area of Needed Data (2) Reclamation: DP1 → DP3
Move to DP3 after deleting DP1 data in unneeded area Note)
- ▨ and ▨ in DP1 = reusable areas
- ▨ in DP3 = Needed data from DP1 ▨ moved during reclamation (3) Written: DP2, DP3
Start writing data to free space in DP3 after data written to DP2 reaches a predetermined capacity Note)

- ▦ in DP2 = Area of Unneeded Data
- ▨ in DP2 = Area of Needed Data
- ▨ in DP3 = New Data Written to DP3

(4) Reclamation: DP2 → DP1

Note)

- ▨ and ▨ in DP2 = reusable areas
- ▨ in DP1 = Needed data from DP2 ▨ moved during reclamation Note)

(5) Written: DP3
New data in DP3 has reached a predetermined capacity and is no longer written.

(6) Written: DP1
New data written to free space in DP1.

(7) Reclamation: DP3 → DP2
Needed data in DP3 moved to data in DP2 during reclamation.

Data Copying Method of the Present Invention

Normal Writing: Data transferred using host and area of Buffer B, and written to DP2.

Reclamation: When data capacity is reached, data read from partition (DP1) to area of Buffer A, and then written to new partition (DP3).

FIG. 13

Copying Method Compressing Deleted Data to Zero

(a) Unneeded blocks 2, 3, 5, 7 compressed from DP1 to DP3 and reclaimed

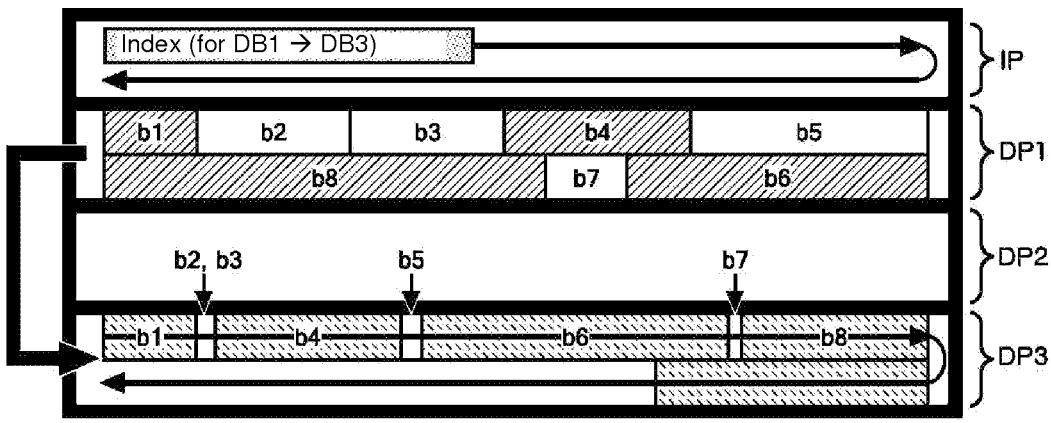

(b) Index of File A, File B and File C stored in DP1 (ID = a) <u>before reclamation</u>

| Index | File A | File B | File C |
|---|---|---|---|
| Partition ID | a | a | a |
| Start Block | 0 | 5 | 25 |
| Block Length | 5 | 20 | 20 |

(c) Index <u>after</u> File B deleted from State (b) and <u>reclaimed</u> in DP3 (ID = c)

| Index | File A | File B (Deleted) | File C |
|---|---|---|---|
| Partition ID | c | - | c |
| Start Block | 0 | - | 5 |
| Block Length | 5 | - | 20 |

RECLAMATION OF DATA ON TAPE CARTRIDGE

FIELD

This disclosure relates to a method for automatically reclaiming data on a tape cartridge (tape, medium) which has been managed and divided into a plurality of data partitions. More specifically, the disclosure is a method for automatically reclaiming unneeded data from changed (edited) files in a file system using a medium divided into at least three data partitions.

BACKGROUND

A tape drive such as an LTO (Linear Tape Open) tape drive writes data to a tape sequentially in the longitudinal direction of the tape medium. The tape drive uses the appended writing format to write and update data, and data becomes unreadable when data is changed on the tape. The first half of data written to the tape is unneeded data, updated data is appended to the second half as needed data, and new data cannot be written to the areas in which unneeded data is stored. The unneeded data remains on the tape cartridge, and the entire capacity of the medium cannot be effectively used.

The Linear Tape File System (LTFS) is a file system that can handle data on a tape using a file format. LTFS can use the same tape drive file system as a fifth-generation Linear Tape Open (LTO5) tape drive and the fourth-generation IBM Enterprise TS1140 tape drive. When files are edited in an LTO tape drive using LTFS, the reading and updating characteristics described above pose a significant challenge.

Even when files written to LTO using LTFS are deleted, data from the deleted files remains on the tape. When the content of files is not deleted but updated, the updated data is appended to the end of the tape, and the data prior to the update remains on the tape. The areas in which unneeded data is written cannot be reused for the reasons described above. Therefore, the capacity of the tape may not be sufficient to accommodate frequently updated files even when the actual size of the files has not increased.

Reclamation can be performed to reuse data storage area on a tape when the amount of unneeded data on the tape has increased. In the reclamation method of the prior art, the needed data is copied from one tape to another. Two drives are needed during the copying process. Two tapes are also required: a source tape and a destination tape. A method is currently being considered in which tape data is transferred to a hard disk drive (HDD) and then written directly to a tape. The tape capacity in LTO5 is 1.5 TB when data compression is not used. Therefore, an HDD requires a work space of 750 GB just to handle the unneeded data taking up half the capacity.

A tape drive is described in PCT Publication No. 2010-522914 in which two cartridges are used in the reclamation process: a source medium and a destination medium for copying data.

SUMMARY OF INVENTION

Technical Problems

The reclamation process of the prior art is very costly in terms of time because the user has to find free time during normal reading and writing operations to copy data. Therefore, a low-cost method is desired which allows for the reuse (reclamation) of unneeded data areas on a tape while also not placing constraints on normal reading and writing operations.

The present invention provides a method for automatically reclaiming tape cartridges during normal reading and writing operations.

Means of Solving the Problem

The present disclosure provides a method for automatically reclaiming areas with unneeded data in a tape cartridge (medium) storing files updated by appended writing. In this reclamation method, the appended writing entails the sequential compression of data needed by the updated file (needed data) and data not needed by the file (unneeded data) and storage of the compressed data on the medium, and the medium is divided into at least three data partitions (DP1, DP2, DP3) for the storage of data. The method includes the steps of: (a) starting the writing of data to a first data partition (DP1), and continuing the writing of data to a second data partition (DP2) (writing to DP1 and DP2) after the data written to the first data partition (DP1) has reached a predetermined capacity; (b) moving the needed data and unneeded data stored in the first data partition (DP1) to the third data partition (DP3) replacing unneeded data with data including highly compressible data, and partially reclaiming data storage area in the first data partition (DP1) after the writing of data to the first data partition (DP1) has been completed; (c) writing data to the free space of the third data partition (DP3) (writing to DP3) after the data written to the second data partition (DP2) has reached a predetermined capacity; (d) moving the needed data and unneeded data stored in the second data partition (DP2) to the third data partition (DP3) replacing unneeded data with data including highly compressible data, and partially reclaiming data storage area in the second data partition (DP2) after the writing of data to the second data partition (DP2) has been completed; (e) writing data to the free space of the first data partition (DP1) (writing to DP1) after the data written to the third data partition (DP3) has reached a predetermined capacity; and (f) moving the needed data and unneeded data stored in the third data partition (DP3) to the second data partition (DP2) replacing unneeded data with data including highly compressible data, and partially reclaiming data storage area in the third data partition (DP3) after the writing of data to the third data partition (DP3) has been completed.

In this reclamation method, the partial reclamation is executed when the percentage of needed data stored in the data partition prior to data movement is equal to or less than an established threshold.

In this reclamation method, the medium is divided to form an index partition (IP) for storing an index of files written to the data partitions (DP), the index includes metadata on data portions of the files stored in the data partitions (DP), the metadata includes position information (extents) on needed data for the files stored in the data partitions (DP), the index includes extents (block numbers, offsets, sizes) and data partition IDs, and the partial reclamation entails changing a moved file in the index from the ID of the data partition prior to data movement to the ID of the data partition subsequent to data movement.

In this reclamation method, the percentage of needed data in each data partition is calculated using an index.

In this reclamation method, the established threshold is 50%.

In this reclamation method, the partial reclamation entails starting the movement of data when the writing of data to the data partition prior to data movement has been completed, and the normal capacity for writing data to the subsequent data partition exceeds an established value.

In this reclamation method, the partial reclamation entails replacing all of the unneeded data with zeroes which obtains highly compressible data without changing the size, and moving the replaced data along with the needed data from the data partition prior to data movement to the data partition subsequent to data movement.

The present disclosure also provides a tape device for automatically reclaiming areas with unneeded data in a tape cartridge (medium) storing files updated by appended writing. Appended writing entails the sequential compression of data needed by the updated file (needed data) as well as data not needed by the file (unneeded data), and storage of the compressed data on the medium. This tape device is characterized by the sequential storage of data on the medium during appended writing of an updated file of both needed data and unneeded data with compression. The controls performed by the tape device divide the medium into at least three data partitions (DP1, DP2, DP3) for the storage of data. The controls performed by the device also execute the steps of: (a) starting the writing of data to a first data partition (DP1), and continuing the writing of data to a second data partition (DP2) (writing to DP1 and DP2) after the data written to the first data partition (DP1) has reached a predetermined capacity; (b) moving the needed data and unneeded data stored in the first data partition (DP1) to the third data partition (DP3) replacing unneeded data with data including highly compressible, and partially reclaiming data storage area in the first data partition (DP1) after the writing of data to the first data partition (DP1) has been completed; (c) writing data to the free space of the third data partition (DP3) (writing to DP3) after the data written to the second data partition (DP2) has reached a predetermined capacity; (d) moving the needed data and unneeded data stored in the second data partition (DP2) to the third data partition (DP3) replacing unneeded data with data including highly compressible, and partially reclaiming data storage area in the second data partition (DP2) after the writing of data to the second data partition (DP2) has been completed; (e) writing data to the free space of the first data partition (DP1) (writing to DP1) after the data written to the third data partition (DP3) has reached a predetermined capacity; and (f) moving the needed data and unneeded data stored in the third data partition (DP3) to the second data partition (DP2) replacing unneeded data with data including highly compressible unneeded, and partially reclaiming data storage area in the third data partition (DP3) after the writing of data to the third data partition (DP3) has been completed.

The present disclosure also provides a program in a computer (tape device) for automatically reclaiming areas with unneeded data in a tape cartridge (medium) storing files updated by appended writing. The appended writing entails the sequential compression of data needed by the updated file (needed data) and data not needed by the file (unneeded data) and storage of the compressed data on the medium. The program divides the medium into at least three data partitions (DP1, DP2, DP3) for the storage of data. The program executes in a computer (the tape device) the steps of: (a) starting the writing of data to a first data partition (DP1), and continuing the writing of data to a second data partition (DP2) (writing to DP1 and DP2) after the data written to the first data partition (DP1) has reached a predetermined capacity; (b) moving the needed data and unneeded data stored in the first data partition (DP1) to the third data partition (DP3) replacing unneeded data with data including highly compressible, and partially reclaiming data storage area in the first data partition (DP1) after the writing of data to the first data partition (DP1) has been completed; (c) writing data to the free space of the third data partition (DP3) (writing to DP3) after the data written to the second data partition (DP2) has reached a predetermined capacity; (d) moving the needed data and unneeded data stored in the second data partition (DP2) to the third data partition (DP3) replacing unneeded data with data including highly compressible, and partially reclaiming data storage area in the second data partition (DP2) after the writing of data to the second data partition (DP2) has been completed; (e) writing data to the free space of the first data partition (DP1) (writing to DP1) after the data written to the third data partition (DP3) has reached a predetermined capacity; and (f) moving the needed data and unneeded data stored in the third data partition (DP3) to the second data partition (DP2) replacing unneeded data with data including highly compressible unneeded, and partially reclaiming data storage area in the third data partition (DP3) after the writing of data to the third data partition (DP3) has been completed.

Effect of the Invention

The method embodying the present disclosure is able to automatically reclaim a tape cartridge during the normal reading and writing process.

BRIEF DESCRIPTION OF THE DRAWINGS

FIG. 3 shows the method used by a tape drive in an LTFS to repeatedly write data to a tape longitudinally and partially change the data in a plurality of files.

FIG. 4 shows the content of the index partition and the data partition in an LTFS-formatted medium.

FIG. 5 shows the changed content of the index information when size-L File 1 has been partially rewritten.

FIG. 13 shows a situation in which a file including unneeded data (unneeded blocks) is compressed and reclaimed.

DETAILED DESCRIPTION

The following is an explanation of an embodiment (example) in which reclamation is performed on data in an edited file while new files are being written from the host and files are being edited. The following is explained in the example:
1. The automatic reclamation flow.
2. The data copying method.
3. Switching between reclamation and normal reading and writing.
4. The data copying method in which deleted data has been compressed to zero values.

The example will be explained with reference to data reclamation on a tape medium (FIG. 1), the configuration and operation of the tape drive (FIG. 2), the writing (updating/editing) of data in files stored on the medium (FIG. 3), file updating by a tape drive using the LTFS file system and index partition/data partition format of this file system (FIG. 4), and the content of the index (metadata) when a portion of a file has been updated using LTFS (FIG. 5).

Beginning with LTO5, a technique has been used in which the data area is divided into "partitions" to create a plurality of tape areas so that LTFS can be used to manage data as file units. From LTO6, as many as four partitions can be supported. LTFS includes a data item called an index which gathers metadata on files so that data can be managed as files. The index uses one partition, and this partition is called the index partition (IP). The data itself is recorded on the partitions other than the index partition (IP), and these partitions are called data partitions (DP).

Figure 1:
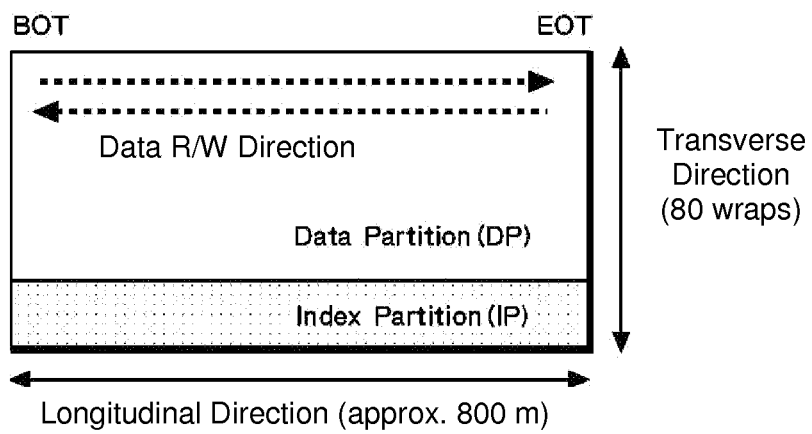
FIG. 1 shows tape divided into two LTFS partitions.

FIG. 1 shows the data areas on a typical tape which has been divided into two partitions for use in LTFS. In an LTO5 tape drive, data is written back and forth on "wraps", which are write areas extending in the longitudinal direction of the tape. In LTFS, two wraps (one round trip) are used as the index partition. The tape is divided into two partitions, an index partition (IP) and a data partition (DP), from the beginning of the tape (BOT) to the end of the tape (EOT). A head is able to simultaneously read and write data from a group of tracks, and each wrap corresponds to 16 tracks. In an LTO5 tape cartridge, the tape is approximately 800 m long and 80 wraps wide. The index partition (IP) and the data partition (DP) are separated by a guard band composed of two wraps. The tape advances forward and backward in the longitudinal direction of the wraps, and reverses direction at the BOT and the EOT. This change in direction is called a "wrap turn". It takes the head in a tape drive 60 to 90 seconds to travel longitudinally along the tape from BOT to EOT. The head travels longitudinally along half of the tape in 30 to 45 seconds. The storage capacity of an LTO5 tape cartridge is approximately 1 TB. The capacity of the index partition (IP) containing the metadata can be changed by the user, but typically occupies 5% of this capacity (50 GB).

When a user writes data to a tape medium using LTFS, metadata referred to as an index file (or simply as "the index") is written to the tape medium in addition to the files themselves. The metadata in the index includes file names, file creation dates, the positions of the files on the medium, and size information (extents). A new index is written to the index partition (IP). The files themselves and the index history are written to the data partition (DP). When files are read and written to a tape medium using LTFS, data is read and written in units called "blocks". Blocks are managed using a number which refer to the number of block from the beginning of the partition. This is used in each partition including recorded blocks. Each file and its corresponding blocks (Block #N through Block #N+α for File A) are stored in the index.

Figure 2:
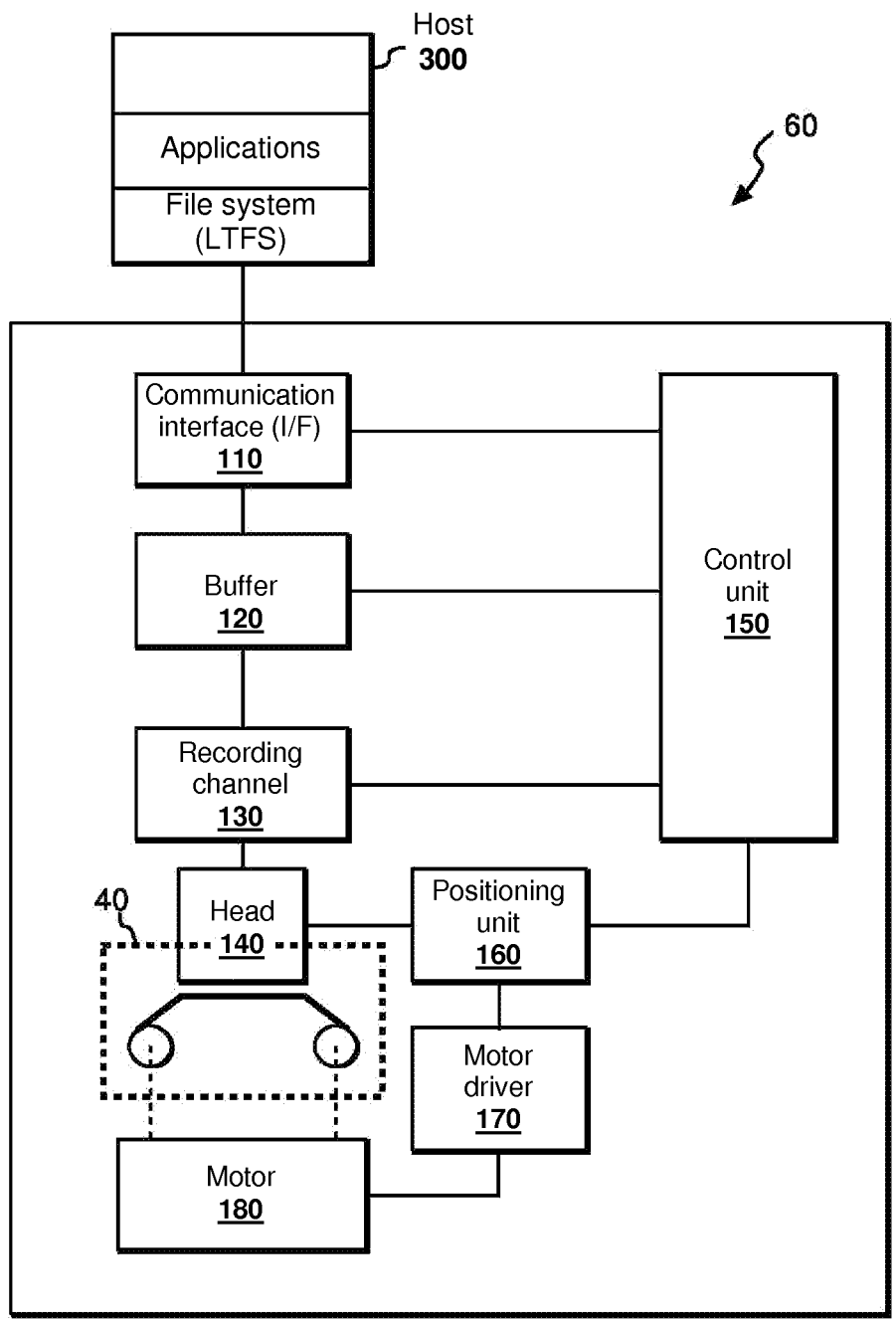
FIG. 2 shows an example of a hardware configuration for a storage system including a tape drive (magnetic tape drive) connected to a host in which the present invention has been embodied.

FIG. 2 shows an example of a hardware configuration for a (typical) storage system including a tape drive (magnetic tape drive) in which the present invention has been embodied. The tape drive 60 receives read/write requests from an application in a host 300 via the file system (LTFS). The tape drive includes a communication interface (I/F) 110, a buffer 120, a recording channel 130, a read/write head 140, a control unit 150, a positioning unit 160, a motor driver 170, and a motor 180.

The interface 110 communicates with a host device 300 via a network. For example, the interface 110 receives from the host device 300 write commands instructing the device to write data to a tape cartridge (tape, medium) 40. The interface 110 also receives from the host device 300 read commands instructing the device to read data from the medium 40. The interface 110 has a function for compressing write data and decompressing compressed read data. This function increases the actual storage capacity of the medium relative to the data by nearly a factor of two.

The tape drive 60 reads and writes to the medium 40 in data set (DataSet, DS) units composed of a plurality of records sent from an application in the host device 300. The typical size of a DS is 4 MB. The host device 300 specifies files in the file system or records in SCSI commands when sending write/read requests to the tape drive. DS are composed of a plurality of records.

Each DS includes management information related to the data set. User data is managed in record units. Management information is included in a data set information table (DSIT). A DSIT includes the number of records and FMs in the DS, and the cumulative number of records and FMs that have been written from the beginning of the medium.

The buffer 120 is memory used to temporarily store data to be written to the medium 40 or data to be read from the medium. For example, the buffer 120 may be dynamic random-access memory (DRAM). A recording channel 130 is a communication pathway used to write data stored in the buffer 120 to the medium 40 or to temporarily store data read from the medium 40 in the buffer 120.

The read/write head 140 has a data read/write element for writing data to the medium 40 and reading data from the medium 40. The read/write head 140 in the present embodiment has a servo read element for reading signals from the servo tracks provided on the medium 40. The positioning unit 160 directs the movement of the read/write head 140 in the shorter direction (width direction) of the medium 40. The motor driver 170 drives the motor 180.

The tape drive 60 writes data to a tape and reads data from a tape in accordance with commands received from the host device 300. The tape drive 60 includes a buffer, a read/write channel, a head, a motor, tape-winding reels, read/write controls, a head alignment control system, and a motor driver. A tape cartridge is detachably loaded in the tape drive. The tape moves longitudinally as the reels rotate. The head writes data to the tape and reads data from the tape as the tape moves longitudinally. The tape cartridge 40 includes non-contact/non-volatile memory called cartridge memory (CM). The tape drive 60 reads and writes to the CM installed in the tape cartridge 40 in a non-contact manner. The CM stores cartridge attributes. During reading and writing, the tape drive retrieves cartridge attributes from the CM in order to perform the read/write operation properly.

The control unit 150 controls the entire tape drive 60. In other words, the control unit 150 controls the writing of data to the medium 40 and the reading of data from the medium 40 in accordance with commands received via the interface. The control unit 150 also controls the positioning unit 160 in accordance with retrieved servo track signals. In addition, the control unit 150 controls the operation of the motor via the positioning unit 160 and the motor driver 170. The motor driver 170 may be connected directly to the control unit 150.

FIG. 3 shows the method used by a tape drive in an LTFS to repeatedly write data to a tape longitudinally and partially change the data in a plurality of files. Each file is distinguished by a pattern classification. In the top drawing (A), each file is initially recorded in a continuous manner (1st, 2nd, 3rd, 4th files). The bottom drawing (B) shows the data section on the tape after each file has been partially changed. Data sections 1, 3, and 5 of the 1st file have been overwritten, deleted or otherwise changed, but data sections 2 and 4 have not been changed. Data section 6 in the second file has been changed. Data section 7 in the 4th file has been changed. The original data for the data sections that have been changed remains on the medium as invalid data. The new data for changed data sections 1, 3, 5, and 6 is appended (append-written) sequentially after the EOD (end of data) of the files.

FIG. 4 shows the content of the index partition and the data partition in an LTFS-formatted medium.

FIG. 4 (A) shows information written to a tape medium immediately after the tape medium has been initialized using the LTFS format. The information shown in (A) is to be written to the tape medium immediately after the tape medium has been initialized using the LTFS format.

FID (Format Identification Dataset) is special data written at the beginning of the tape medium when the tape drive initializes the tape medium, and includes information such as the number of partitions in the tape medium and the capacity of each partition.

VOL1Label, also called the ANSI Label, is a general format label literally defined by ANSI.

LTFSLabel is a label stipulated by the LTFS format, and holds information indicating which version of the LTFS format was used to format the tape medium. The size of the records recorded on the medium is indicated here. The record size is also known as the block size. The record size is ensured even when the end of the file is less than the block size (for example, 512 KB).

FM (Filemarks) are commonly used in tape media. These are used to specify the head of data (seek), and function similar to bookmarks.

Index #0 is the index written during formatting. At this stage, it does not include file-specific information because no files are present, but rather holds information such as the volume name of the tape medium.

FIG. 4 (B) shows information written to a tape medium when a file has been written after the tape medium has been initialized using the LTFS format.

FIG. 4 (B) shows the data written to the tape medium when a file (File 1) is written after initialization of the tape medium using the LTFS format. The portion demarcated by the bold lines is added/updated data. Index#1 has metadata (index information) on File 1. The IP only holds an updated index. The DP holds the index history. The timing for updating the index is left to the implementation of the file system. Updates may be performed at fixed time intervals or may be updated only when a tape medium is removed from the tape drive. Even in the case of further continued use, the index positioned in the IP is always only the most recent index, and files and indices are appended to the DP without overwriting the existing indices.

FIG. 4 (C) shows information written to a tape medium when another file has been written (File 2) following the state shown in (B).

When an initial file (File 1) has been written to the tape medium and the next file (File 2) is added, File 1 and File 2 are stored continuously on the tape medium. Index#2 has metadata (the index information) for File 1 and File 2.

FIG. 4 (D) shows metadata written to a tape medium following the state shown in (B) when character information (File 1-2) has been appended to the end of File 1 and File 1 has been updated. After a file written to the tape medium has been updated using a document creating application, a single file (File 1) is fragmented (dispersed) and recorded as File 1-1 and File 1-2. During file rewriting, the reduction in the amount of free capacity in the tape medium at the time of the update depends on the amount of information.

FIG. 5 shows the changed content of the index information when size-L File 1 has been partially rewritten.

In an index, file position information (pointers) are stored in a format called an "extent". Extent elements include the number of the block (StartBlock) at the beginning of a file portion (data portion), the start offset (ByteOffset) inside the block of this number, the size of the data (ByteCount), and the file position in the data portion (FileOffset). User data is stored on the medium in record units of a size determined by the block size (for example, 512 KB).

StartBlock indicates the order of blocks of a fixed size from the beginning of the tape medium.

ByteOffset indicates the offset for the beginning of writing inside a block of a particular number.

ByteCount indicates the data size of the data portion indicated by the extent.

FileOffset indicates the file position in the data portion indicated by the extent.

A block includes a record or Filemark (FM: record delimiter), and the size is indicated in the LTFS Label. The user data is recorded in the medium in record units of a size determined by the block size (for example, 512 KB).

At the beginning, in (A), when the size of File 1 recorded on the medium is L, the index indicates extent (x). File 1 is written continuously in record units on the tape medium in the longitudinal direction as indicated by the cross-hatched portion. The records correspond to blocks in the extent. When a data portion is rewritten after File 1 has been written, as shown in (B), and 600 KB from the M bytes of File 1 has been replaced with a 250 KB record, and extents (x), (y), and (z) are written.

Extent (y) indicates the 250 KB data (record) in which 600 KB have been changed and written to a data portion of File 1. The data portions are not consecutive, so this is appended as a record of successive block numbers (StartBlock: N+4).

In extent (y), 250 KB is appended (append write) from ByteOffset=0 of StartBlock=N+4.

Extent (x) indicates the data (record) to ByteCount=M of StartBlock=N. Here, 600 KB of data has been changed from offset M of Block N.

Extent (z) indicates a data portion of ByteCount=L−(M+600) from ByteOffset=(M+600 K) modD of StartBlock=N+2. Here, D is the block size (for example, 512 KB). ByteOffset is the remainder of M+600 KB divided by D, and the offset is provided in block number N+2.

The index of File 1 includes fragmented (dispersed) alignment information so that extent (x)→extent (y)→extent (z) due to the rewriting of data portions. The shaded area including the 250 KB of data is the needed data, and 600 KB of data is unneeded data.

The example of the present invention is executed in the following steps.

The automatic reclamation method proposed here uses three data partitions (DP1, DP2, DP3).

Data writing starts with DP1.

When the data written to DP1 reaches the predetermined capacity, writing to DP1 is stopped. Data writing then starts in DP2.

Data in DP1 is moved to DP3 after the unneeded areas have been deleted. Because the unneeded areas have been deleted, the data in DP3 does not reach the predetermined capacity. Because writing to DP2 cannot be performed at the same time, the LTFS controls the process so that data is written normally to DP2 and then data is copied to DP3. When the data has been moved from DP1 to DP3, the data areas in DP1 can be reused.

When the data written to DP2 reaches the predetermined capacity, writing is stopped. Data writing then starts in the free space of DP3.

5. Data in DP2 is moved to DP1 after the unneeded areas have been deleted.

This operation is repeated.

By using three partitions in this way, a tape can be reused without having to completely interrupt the writing of data to the tape, by using a single drive, and without a user operation.

The proposed method for moving data between data partitions (DP) includes more than simply deleting unneeded areas. The unneeded data is sent as zero values with the compression function enabled. When all of the unneeded data has been converted to zero values as part of the compression function, the area used physically to write the data is reduced significantly and this increases the capacity. For example, when the unneeded data segments are converted to zero values and moved during the copying process, the data size is equal to or less than 10% of the original data size. In this example, the replacement data is zero. However, any other replacement data can be used as long as the data is highly compressible. In this method, the data itself can be replaced by highly compressible data without changing the size of the unneeded data.

Moving the unneeded data with compression is especially effective for using LTFS. In LTFS, there is a single index partition (IP) in addition to the data partitions (DP). Because the index partition (IP) stores metadata (index information) on all of the files written to the data partitions (DP), the information on newly written areas has to be updated for all file information when data is moved (including the partition numbers, block numbers and block lengths).

When this method is used, the block numbers and the block lengths do not have to be changed. When there is an index for each partition, the index changes that have to be performed when data is moved between data partitions (DP) in the proposed method correspond only to the partition numbers indicated in the index. When this method is not used, the content of all files in the partition have to be updated.

1. Automatic Reclamation Processing Flow:

FIG. 6 through FIG. 10 show an example of automatic reclamation in which files are written (and changed) normally in the three data partitions of the medium, and partial reclamation is performed. Partial reclamation refers to a process in which the file data in a data partition is divided into needed data and unneeded data, data is moved to another data partition, and storage areas are reused. When the writing of data to each data partition has been completed, partial reclamation is executed as the next step.

Figure 6:
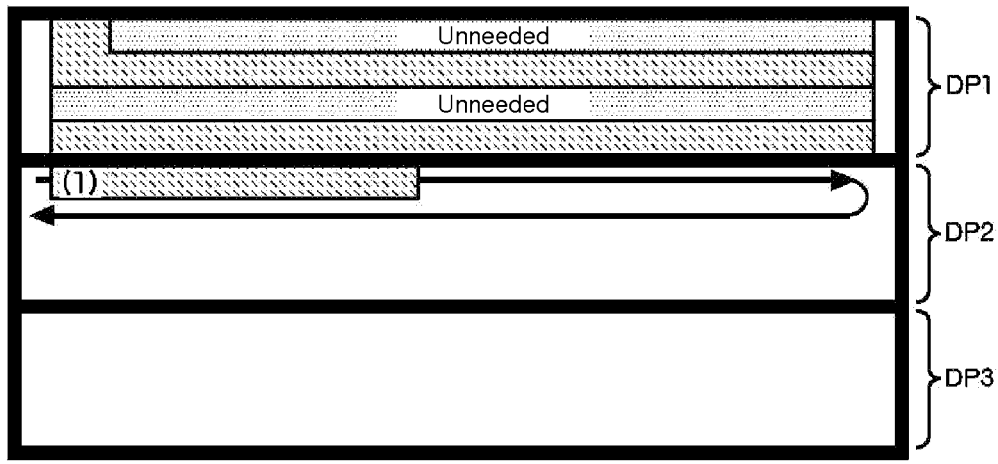
FIG. 6 shows how a file is normally written and edited in a data partition according to the first step of the automatic reclamation method of the present invention.

FIG. 6 shows the first step (the normal writing of files) in the automatic reclamation method of the present invention.
(1) In the first step, data writing starts with DP1. The writing of data to DP2 starts once the data in DP1 has reached a predetermined capacity and can no longer be written to the data partition. The gray portions are the areas with unneeded data.

Figure 7:
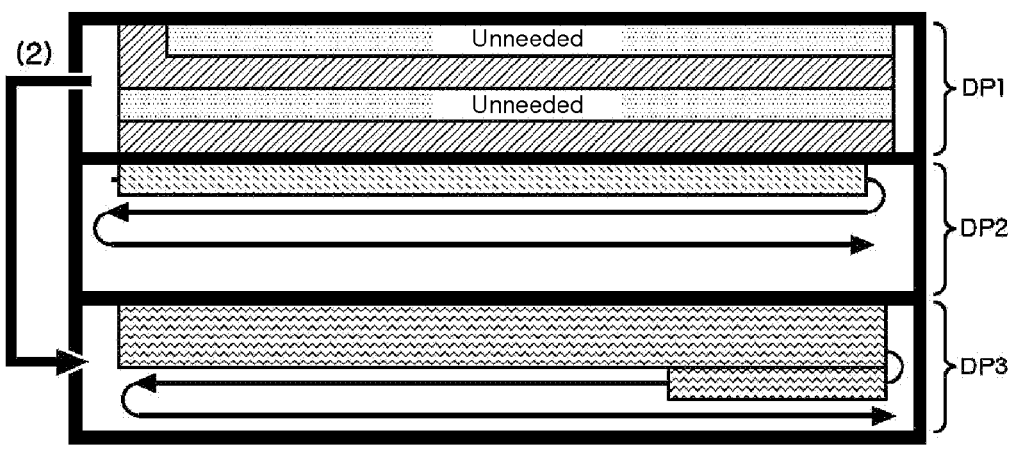
FIG. 7 shows how a new file is written and edited in a data partition according to the second step of the automatic reclamation method of the present invention.

FIG. 7 shows the second step (partial reclamation) in the automatic reclamation method of the present invention.

(2) In the second step, partial reclamation is performed by deleting the unneeded data in DP1 and moving the data to DP3. The gray portions and shaded portions of DP1 are storage areas that can be reused. The wavy line portions of DP3 indicates the needed data from the shaded portions of DP1 that has been moved.

Figure 8:
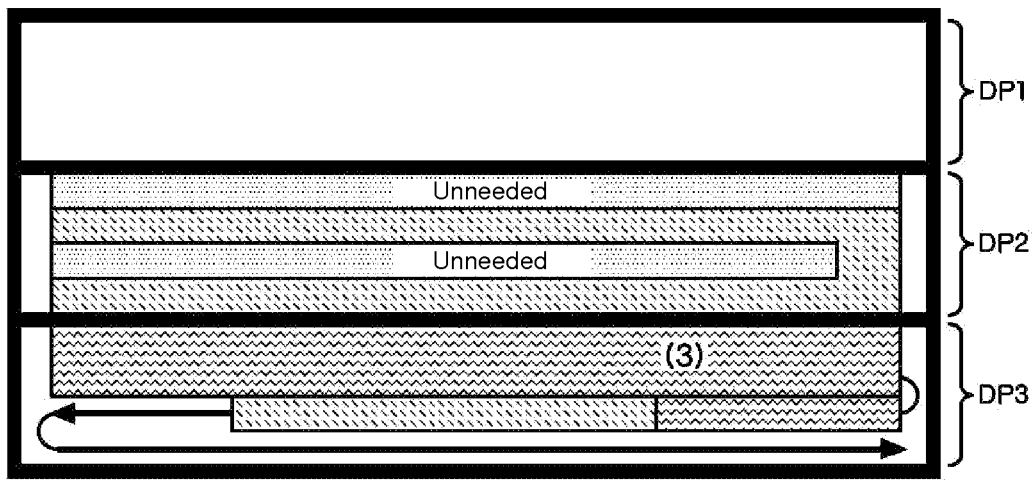
FIG. 8 shows how a file is written and edited in a data partition according to the third step of the automatic reclamation method of the present invention.

FIG. 8 shows the third step (the normal writing of files) in the automatic reclamation method of the present invention.
(3) In the third step, writing continues to the free space of DP3 after partial reclamation has been completed.

In FIG. 8, the writing of data to the free space of DP3 starts once the data in DP2 has reached a predetermined capacity and can no longer be written to the data partition. The gray portions in DP2 indicate unneeded data, and the dotted portions indicate needed data. The dotted portions of DP3 indicate the continuation of new data writing.

Figure 9:
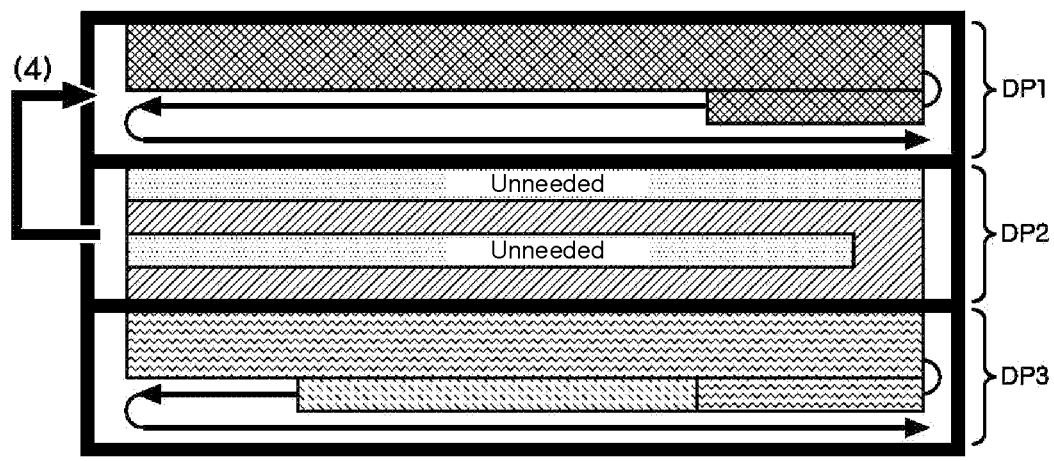
FIG. 9 shows how a new file is written and edited in a data partition according to the fourth step of the automatic reclamation method of the present invention.

FIG. 9 shows the fourth step (partial reclamation) in the automatic reclamation method of the present invention.
(4) In the fourth step, the unneeded data in DP1 is deleted and the data is moved to DP3. The dotted portions and shaded portions of DP2 are storage areas that can be reused. The meshed portions of DP1 indicates the needed data from the shaded portions of DP2 that has been moved.

Figure 10:
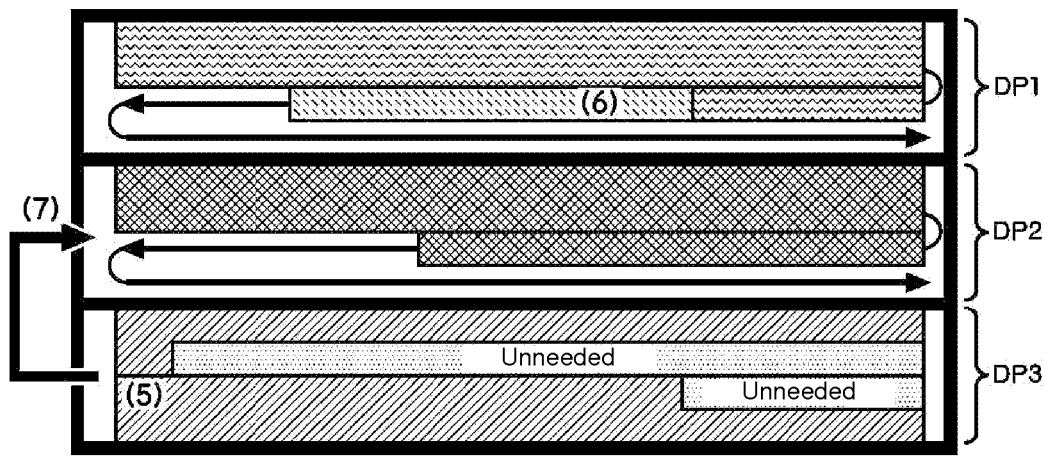
FIG. 10 shows how files are written and edited in a data partition according to the fifth, sixth and seventh steps of the automatic reclamation method of the present invention.
Figure 11:
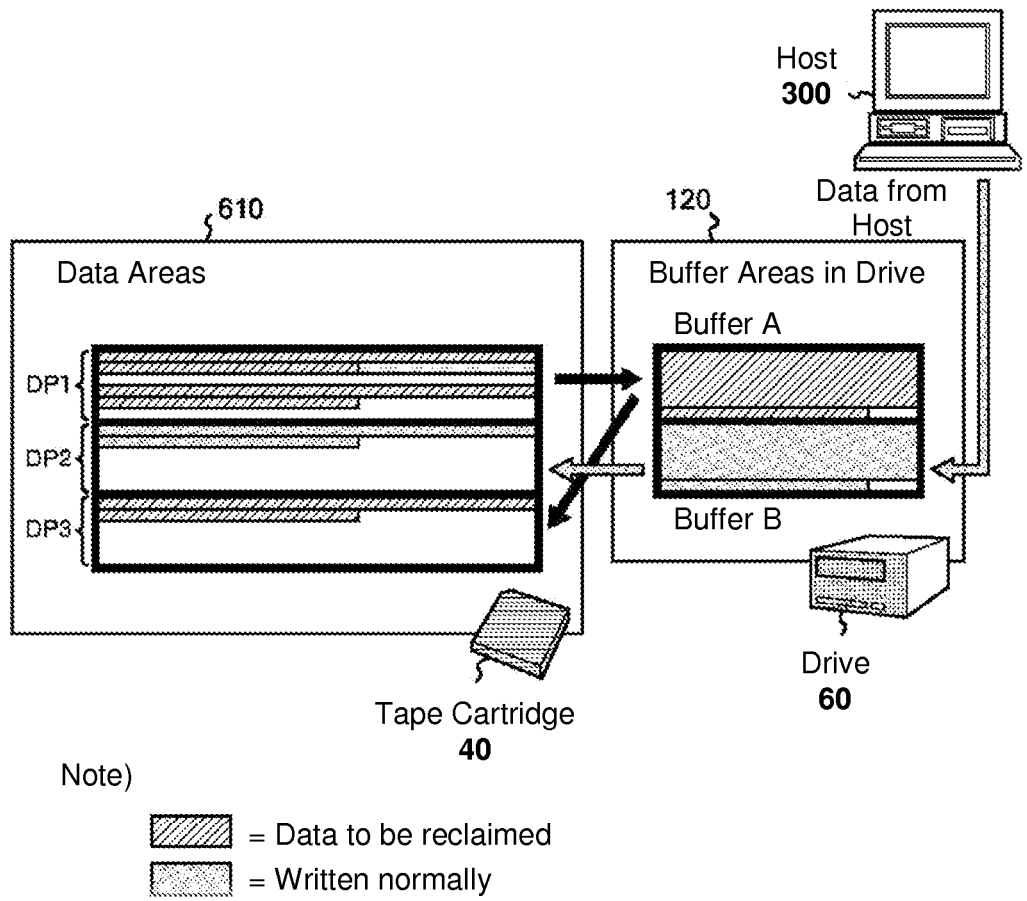
FIG. 11 shows the method of copying data while switching between writing data from the host and performing reclamation.

FIG. 10 shows the fifth and sixth steps (the normal writing of files) and the seventh step (partial reclamation) in the automatic reclamation method of the present invention. The normal writing in the fifth and sixth steps and the partial reclamation in the seventh step are repeated on each data partition.
(5) The continued writing in the fifth step is performed once the partial reclamation in the second step (2) has been performed, data has been written to the free space of DP3, and the predetermined capacity has been reached.
(6) The continued writing in the sixth step starts to the free space of DP1 once the partial reclamation in the fourth step (4) has been performed
(7) In the partial reclamation performed in the seventh step, the needed data in DP3 is moved to space in DP2 that has been freed up by the partial reclamation performed in the fourth step (4).
2. Data Copying Method:

FIG. 11 shows the method of copying data while switching between writing data from the host and performing reclamation.

The gray arrows indicate the flow of data during normal file writing and file editing. The black arrows indicate the flow of data during partial reclamation in each data partition. The buffer 120 in the drive 60 is separate from the storage areas and can be used in separate reading and writing processes. The automatic reclamation is embodied by dividing an area of the drive buffer 120 into buffer B for normal reading and writing and buffer A for reclamation reading and writing. As shown in the drawing, normal reading and writing is performed by transferring data and writing the data to DP3 using the host 300 and the area in drive buffer B. The entire data copying method can be handled inside the drive. In partial reclamation, data is read to drive buffer A from the partition (DP1) when the predetermined tape capacity has been reached, and the data is written to a new partition (DP3). In order to perform the data copying method properly during partial reclamation, new processing functions have to be added to the firmware of current LTO5 and TS1140 tape drives. In another method, the divided drive buffer is not used. Instead, data is transferred to the HDD of the host and then written to the tape. In this method, the tape drive itself does not require these additional functions.

3. Switching Between Reclamation and Normal Reading and Writing:

The method in the present example can switch between partial reclamation and normal reading and writing. In the following flow, LTFS is used to switch the processes performed by the drive.

A. Buffer A and B Size Allocation:

Capacity X is acquired from the drive for buffer A. The size of buffer B used in normal reading and writing does not require LTFS knowledge. Because the sizes of buffers A and B are determined at drive startup, the appropriate values may be determined beforehand with reference to the history of the system used by the LTFS.

B. Timing of Partial Reclamation:

Information on the partition DP1 being written to reaching the predetermined capacity is acquired from the drive. Because the writing of data to DP1 is completed when writing to DP1 reaches the predetermined capacity, DP1 data may essentially be reclaimed at any time. The LTFS calculates the percentage of valid data in DP1 from the metadata and switches to reclamation mode when the percentage falls below a predetermined value. When a file has been edited many times, the percentage of unneeded data to needed data in the file increases and the valid data eventually falls below the predetermined value. If the predetermined value is 50%, then 50% of the tape capacity can be reused after reclamation. If the predetermined value is 90%, then 10% of the tape capacity can be reused after reclamation.

C. Partial Reclamation Operation:

When reclamation mode has been entered, the LTFS starts moving data in the manner described above. At this time, X amount of value data is read from DP1 to buffer A and then written to DP3. The valid data is identified from the index information in the LTFS. When valid data is discontinuous, X amount of data may be read from DP1 and written entirely to DP3. This is the most effective method for current tape drives.

D. Timing for Normal Reading and Writing:

When a normal reading and writing request is received by the LTFS from an application during reclamation, the LTFS gives priority to processing the request from the application. It switches from reclamation processing back into normal reading and writing mode. In order to understand the processing performed in the flowchart shown in FIG. 12, a check is performed on the timing used to write data to DP3. In the actual reclamation process, the timing used to interrupt reclamation does not have to take into account ease of implementation, and the completion time for the process is shortest on the SCSI command level.

E. Timing for Partial Reclamation after Normal Reading and Writing:

The timing for moving back to reclamation after normal reading and writing is usually triggered when the file processed by the application via the LTFS is closed. The switching also has to take into account the remaining capacity in DP2 which is closely monitored. Reclamation also has to be resumed when a file has been opened but a predetermined period of time has elapsed without any reading or writing occurring. It is theoretically possible to perform the reclamation process during reading and writing. However, it takes time to read and write data to an actual tape drive. Therefore, when reclamation is to be completed in a fixed time period, the normal reading and writing operation should be properly allocated, and the reclamation operation should be performed separately on a certain timing.

Figure 12:
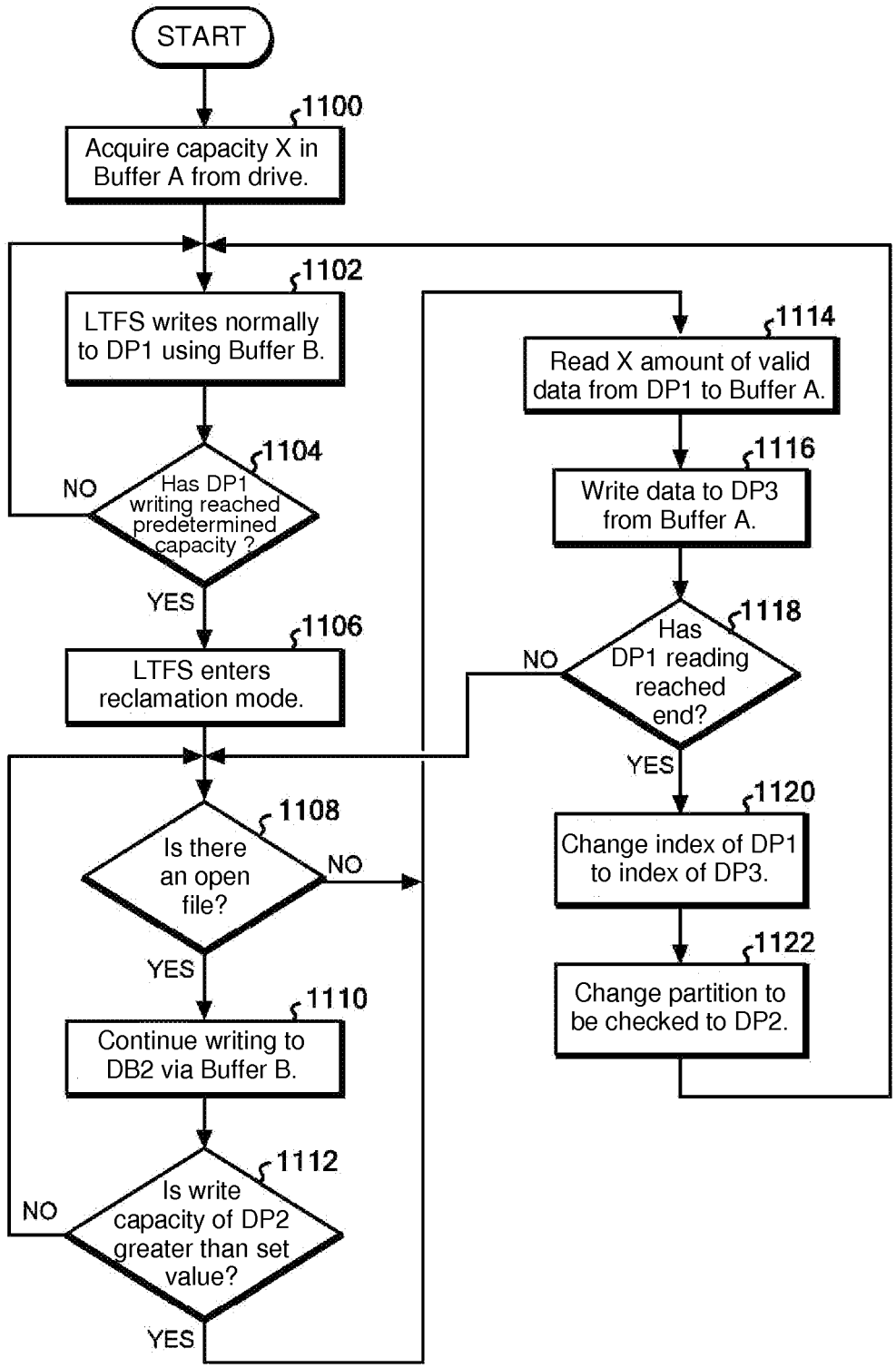
FIG. 12 is a flowchart showing the completion of automatic reclamation while switching between normal reading and writing operations and reclamation operations.

FIG. 12 is a flowchart showing the completion of automatic reclamation while switching between normal reading and writing operations and reclamation operations.

(1100): Capacity X for buffer A is obtained from the drive buffer 120 for reclamation. At the same time, capacity Y for buffer B is obtained from the drive buffer 120 for normal reading and writing.

(1102) The file system (LTFS) uses buffer B to write and edit files in DP1.

(1104): It is determined whether or not writing to DP1 has reached the predetermined capacity. When the overall capacity of the tape (for example 1 TB) is divided into an IP (5% of capacity) and three data partitions (DP), each data partition is 290 MB. If the determination is YES, the system advances to the partial reclamation process (1106). If NO, normal writing is continued to DP1 (1102).

(1106): When DP1 writing has been completed, the LTFS enters partial reclamation mode. Reclamation is initiated on the timing explained above in (B).

(1108): It is determined whether or not there are any open files. The LTFS determines whether or not there are any files being written or edited. If YES, the data writing process continues on the open files (1110). If NO, the partial reclamation process (1114) is started.

(1110): The writing of data for an open file is continued to DB2 via buffer B.

(1112): It is determined whether or not the amount of data written to DP2 exceeds a predetermined value in order to set the timing for the partial reclamation of file data in DP1. More specifically, the timing used is the one explained in (D) above. The partial reclamation timing is determined so as to take into account the progress in the normal writing. When the normal writing capacity for DP2 has been exceeded, reclamation is started. If the determination is YES, partial reclamation (1114) is started via buffer A. If NO, the writing of open file data continues (1108).

(1114): During partial reclamation, X amount of valid data is read from DP1 to buffer A. If the determination in (1110) is YES, the writing of open file data continues. This data does not include unneeded data arising from file data editing. In order to delete unneeded data, the extent is reset so that the block numbers of the unneeded data are deleted. In order to avoid resetting an extent, the unneeded data is replaced by highly compressed data as explained below, and the unneeded data sections are copied along with the other data. If the determination in (1114) is NO, the valid data (needed data) is written to buffer A and stored.

(1116): During partial reclamation, data is written from buffer A to DP3.

(1118): During partial reclamation, it is determined whether the end of the data read from DP1 has been reached. The end of reclamation of data in DP1 is then determined. If YES, the index is changed (1120). If NO, the system continues to verify whether there is an open file during the writing process (1108).

(1120): When the partial reclamation is ended, the index for the copied files is changed. When the valid data includes needed data and unneeded data, only the data partition ID in the file index is changed. The extents (block numbers, offsets, sizes) do not have to be changed. When the valid data that has been copied only contains needed data, calculating the extents to delete blocks in the unneeded data sections takes time. When the partial reclamation has been completed, the storage area in DP1 occupied by the needed data and the unneeded data in DP1 is released.

(1122): The partition to be checked is changed from data partition DP1 to data partition DP2. The process switches to partial reclamation mode for the file data stored in DP2. Returning to (1102), normal writing continues to DP2 in order to fill the free storage space in DP2 with data. At the same time, the processing steps for partial reclamation of data stored in DP2 are performed in DP1. When partial reclamation of file data in DP2 has been completed, the partition to be checked is changed from DP2 to DP3 (1122). Partial reclamation is then performed on DP3.

4. Copying Deleted Data Compressed Using Zero Values:

FIG. 13 shows a situation in which a file including unneeded data (unneeded blocks) is compressed and reclaimed.

It takes a certain amount of time to calculate the extents when a file is edited, some of the blocks are deleted as unneeded blocks, and the data is moved to another data partition. The data is moved to another data partition and partially reclaimed so as to take into account the size of the unneeded data deleted during the editing process. In this example of the present invention, partial reclamation can be performed quickly because extent-changing calculations are not required with the exception of the data partition ID.

FIG. 13 (*a*) is a conceptual diagram showing how the needed data for a file is compressed and reclaimed along with the unneeded data (unneeded blocks).

This method is used during the copying performed in the partial reclamation steps, which are the second step (FIG. 7), the fourth step (FIG. 9), the seventh step (FIG. 10), the process in (1114) and the process in (1116) (FIG. 12). In (a), blocks 2, 3, 5 and 7 (b2, b3, b5, b7) contain unneeded data. The values in these blocks are changed to zero to accomplish an effective compression function, and the data is written to DP3. As a result, areas with a data size equivalent to the block numbers in DP1 are used in DP3. However, the data is copied to the other data partition after replacing the data in the blocks to be deleted with zeroes in order to increase the compression rate. Because the unneeded data can be compressed to 10% of the original size or less, the reclamation is not insignificant even though the unneeded data remains in the tape area in compressed format. Because the unneeded blocks remain but are replaced by zeroes, there are no positional discrepancies between blocks of needed data in files that have been edited several times. This is advantageous because the time required to recalculate the extents can be eliminated.

In LTFS, the information indicating the location of files includes the following. This information needs to at least include the number of files. In the present invention, the index (metadata) for a file includes a data partition ID along with the extents (start block number, block length).

For example, the information for File A, File B and File C can be established as follows. Here, the partition ID is not a pointer to a physical partition on the tape. The metadata for LTFS is divided into a label portion indicating information for the entire tape, and an index portion including all of the individual file directory information. The information in the table below is a portion of an index including information on each file. The partition information in the index is linked to an actual partition number on a tape and a label.

The partition IDs for file data on data partitions DP1, DP2 and DP3 (referred to below simply as partition IDs) are recorded in the index partition using the following values. The label information (partition IDs) for each data partition DP1, DP2, DP3 has been assigned as follows:

Index for files in DP1 of the tape→ID=a
Index for files in DP2 of the tape→ID=b
Index for files in DP3 of the tape→ID=c FIG. 13 (*b*) shows the index (metadata) for File A, File B and File C stored in DP1 (ID=a) prior to reclamation. The index includes the partition ID for the partition on which each file is stored.

File A includes, as the index, data partition ID=a and an extent (start block number=0, block length=5).
File B includes, as the index, data partition ID=a and an extent (start block number=5, block length=20).
File C includes, as the index, data partition ID=a and an extent (start block number=25, block length=20).

FIG. 13 (*c*) shows the index for each file after the state shown in (b) in which File B has been deleted during editing and the files have been reclaimed on DP3 (ID=c). File B has been deleted, and File A and File C are still valid.

File A includes, as the index, data partition ID=c and an extent (start block number=0, block length=5).
File B remains on the tape but the allocation of an extent and a partition ID has been disregarded in the index.
File C includes, as the index, data partition ID=c and an extent (start block number=25, block length=20).

When the data has been copied while disregarding extent calculations for File B, the start block information for File C needs to be changed as shown in (c). The start blocks for all other files following File C are also changed even though one of the files has been deleted. When there are 10,000 files, the data for all 10,000 files has to be changed if the first file were actually to be deleted.

When the data is compressed by replacing all values with zero, there is much less data in the area in which the compressed data is recorded, but the corresponding block numbers remain the same. Therefore, there is no need to change the start block information for each file in the index. The only operation that has to be performed is to change the label information from ID=a for DP1 from which the data has been copied to ID=c for DP3 to which the data has been copied. Because the label information includes less information than the index information, reclamation performance is very different when only the label has to be changed instead of all of the file information in the index. After file data has been reclaimed in each data partition DP1, DP2, DP3, the data partition ID is changed and recorded in the index partition (IP) as follows.

Index for files copied from DP1 to DP3→ID=c
Index for files copied from DP2 to DP1→ID=a
Index for files copied from DP3 to DP2→ID=b By establishing three partitions, the method of the present invention can complete the partial reclamation process without having to completely interrupt the writing of data to the tape. This enables a tape to be reused using a single drive, and without a user operation. The method of the present invention can provide two data partitions and perform automatic reclamation on the data in one of the data partitions. The present invention is also not limited in terms of the number of partitions on the medium and is not limited to a file system (LTFS). In the present invention, four or more data partitions can be used by a writing application or the write control driver in the tape drive. The present invention was explained above using an embodiment (example), but the technical scope of the present invention is not limited in any way to the embodiment. It should be clear to a person of skill in the art that various modifications and substitutions can be made without departing from the spirit and scope of the present invention.

REFERENCE SIGNS LIST

40: Tape cartridge (medium, tape)
60: Tape drive
110: Communication interface (I/F)
120: Buffer (drive buffer)
130: Recording channel
140: Read/write head 150: Control unit (controller, includes read/write control)
160: Positioning unit
170: Motor driver
180: Motor
300: Host (file system, includes applications)

The invention claimed is:

1. A method for automatically reclaiming areas with unneeded data in a tape cartridge (medium) storing files updated by appended writing, the appended writing entailing the sequential compression of data needed by the updated file (needed data) and data not needed by the file (unneeded data) and storage of the compressed data on the medium, the method dividing the medium into at least three data partitions for the storage of data and comprising the steps of:

starting the writing of data to a first data partition, and continuing the writing of data to a second data partition after the data written to the first data partition has reached a predetermined capacity;

moving the needed data and unneeded data stored in the first data partition to the third data partition replacing unneeded data with data including highly compressible, and partially reclaiming data storage area in the first data partition after the writing of data to the first data partition has been completed;

writing data to the free space of the third data partition after the data written to the second data partition has reached a predetermined capacity;

moving the needed data and unneeded data stored in the second data partition to the third data partition replacing unneeded data with data including highly compressible, and partially reclaiming data storage area in the second data partition after the writing of data to the second data partition has been completed;

writing data to the free space of the first data partition after the data written to the third data partition has reached a predetermined capacity; and moving the needed data and unneeded data stored in the third data partition to the second data partition replacing unneeded data with data including highly compressible unneeded, and partially reclaiming data storage area in the third data partition after the writing of data to the third data partition has been completed.

2. The method according to claim 1, wherein the partial reclamation is executed when the percentage of needed data stored in the data partition prior to data movement is equal to or less than an established threshold.

3. The method according to claim 1, wherein the medium is divided to form an index partition (IP) for storing an index of files written to the data partitions (DP):

the index includes metadata on data portions of the files stored in the data partitions (DP);

the metadata includes position information (extents) on needed data for the files stored in the data partitions (DP);

the index includes extents (block numbers, offsets, sizes) and data partition IDs; and the partial reclamation entails changing a moved file in the index from the ID of the data partition prior to data movement to the ID of the data partition subsequent to data movement.

4. The method according to claim 3, wherein the percentage of needed data in each data partition is calculated using an index.

5. The method according to claim 4, wherein the established threshold is 50%.

6. The method according to claim 1, wherein the partial reclamation entails starting the movement of data when the writing of data to the data partition prior to data movement has been completed, and the normal capacity for writing data to the subsequent data partition exceeds an established value.

7. The method according to claim 1, wherein the partial reclamation entails replacing all of the unneeded data with zeroes but not changing the size to obtain highly compressible data, and the highly compressible data is moved along with the needed data from the data partition prior to data movement to the data partition subsequent to data movement.

8. A tape device for automatically reclaiming areas with unneeded data in a tape cartridge (medium) storing files updated by appended writing, the appended writing entailing the sequential compression of data needed by the updated file (needed data) and data not needed by the file (unneeded data) and storage of the compressed data on the medium, controls performed by the tape device dividing the medium into at least three data partitions for the storage of data and executing the steps of:

starting the writing of data to a first data partition, and continuing the writing of data to a second data partition after the data written to the first data partition has reached a predetermined capacity;

moving the needed data and unneeded data stored in the first data partition to the third data partition replacing unneeded data with data including highly compressible, and partially reclaiming data storage area in the first data partition after the writing of data to the first data partition has been completed;

writing data to the free space of the third data partition after the data written to the second data partition has reached a predetermined capacity;

moving the needed data and unneeded data stored in the second data partition to the third data partition replacing unneeded data with data including highly compressible, and partially reclaiming data storage area in the second data partition after the writing of data to the second data partition has been completed;

writing data to the free space of the first data partition after the data written to the third data partition has reached a predetermined capacity; and moving the needed data and unneeded data stored in the third data partition to the second data partition replacing unneeded data with data including highly compressible unneeded, and partially reclaiming data storage area in the third data partition after the writing of data to the third data partition has been completed.

* * * * *